United States Patent [19]

Behnert

[11] 4,389,842
[45] Jun. 28, 1983

[54] POWER UNIT WITH GAS TURBINE

[75] Inventor: Reinhard Behnert, Bremen, Fed. Rep. of Germany

[73] Assignee: Vereinigte Flugtechnische Werke GmbH, Bremen, Fed. Rep. of Germany

[21] Appl. No.: 245,144

[22] Filed: Mar. 18, 1981

[30] Foreign Application Priority Data

Mar. 29, 1980 [DE] Fed. Rep. of Germany ....... 3012388

[51] Int. Cl.³ .......................... F02C 3/08; F02K 3/02
[52] U.S. Cl. ...................................... 60/39.36; 60/261
[58] Field of Search ................... 60/39.36, 39.41, 263, 60/39.5, 261; 415/1, 205

[56] References Cited

U.S. PATENT DOCUMENTS

| | | | |
|---|---|---|---|
| 2,229,805 | 1/1941 | Graves | 60/39.25 |
| 2,531,761 | 11/1950 | Zucrow | 60/263 |
| 2,715,814 | 8/1955 | Barr | 60/39.25 |
| 2,747,363 | 5/1956 | Cohen et al. | 60/261 |
| 3,613,361 | 10/1971 | Rifkin | 60/39.41 |

FOREIGN PATENT DOCUMENTS 999581 7/1961 United Kingdom ................. 60/263

Primary Examiner—Louis J. Casaregola
Assistant Examiner—Timothy S. Thorpe
Attorney, Agent, or Firm—Ralf H. Siegemund

[57] ABSTRACT

A gas turbine driving a compressor is supplemented by a centrifugal injection chamber which receives fuel as well as air compressed by the compressor; the chamber is configured as an annular nozzle, surrounding the turbine discharge duct, both feeding a mixing tube with thrust nozzle. A portion of the combustion gases is discharged via the annular nozzle, the remainder is fed via a control valve to the turbine.

4 Claims, 1 Drawing Figure

U.S. Patent     Jun. 28, 1983     4,389,842
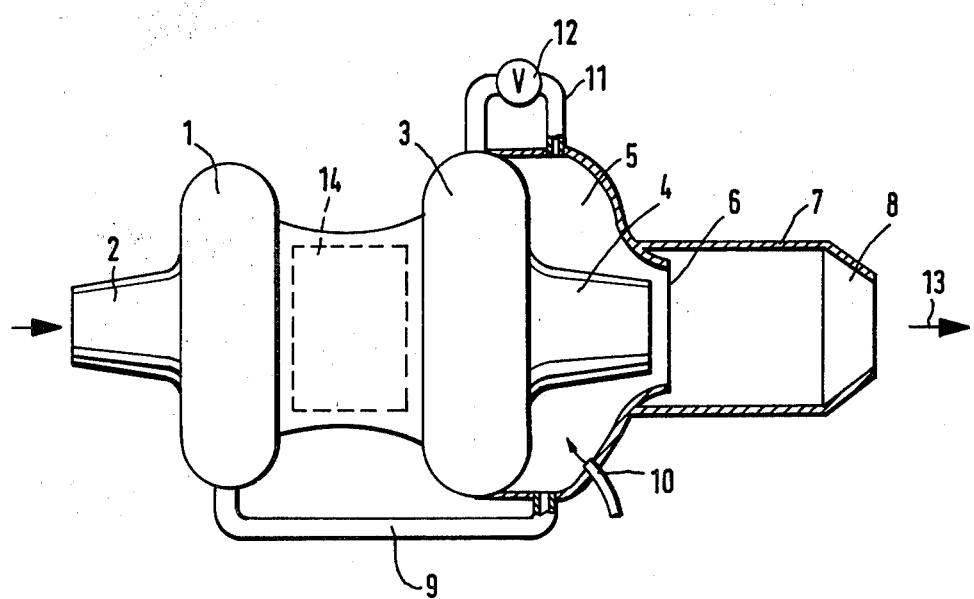

POWER UNIT WITH GAS TURBINE

BACKGROUND OF THE INVENTION

The present invention relates to gas turbines; and more particularly, the invention relates to such turbines of the type in which a compressor and a turbine are interconnected and disposed in a common housing.

Gas turbines of the type to which the invention pertains are frequently used for charging an internal combustion engine, and they are called turbocharger for this reason. The gas turbine uses the exhaust gases of the engine for driving the turbine, while the compressor charges the combustion chambers with fresh air or a gas-air mixture. Since the turbine is driven with gas that is otherwise just discharged, the power output of a thus modified engine is considerably increased.

However, in spite of these unquestioned advantages, such gas turbines are actually rarely used for that purpose. The reason for this is the problem of matching the turbocharger to a large power range of the engine. Valves and bypass line on the fresh-air intake side and/or on the exhaust gas side do permit the exercise of some control, but the practiced solutions are not satisfactory.

Aside from the just mentioned control of a turbocharger, it has been proposed to include a centrifugal chamber in a connection that includes an exhaust bypass and leads into the discharge channel or duct of the turbine. The feed point into that channel is constructed here as an injection nozzle which thus affects these gases as fed into and through the turbine. Tests have been conducted, and they have verified the assumption that one can, indeed, control the power of a turbocharger in that manner; and this approach may well lead to an increase in the employment of such chargers.

DESCRIPTION OF THE INVENTION

It is an object of the present invention to provide a new and improved gas turbine.

It is another object of the present invention to modify gas turbine constructions in a manner rendering them independent from another combustion engine.

It is a specific object of the present invention to provide a new and improved power unit that includes a gas turbine and a compressor.

In accordance with the preferred embodiment of the present invention, a drive unit as per the specific object is improved by surrounding the turbine discharge with an annular nozzle that is part of a centrifugal injection chamber which receives compressed air from the compressor as well as injected fuel. A portion of the resulting combustion gases is fed into the turbine while the remainder is discharged and, preferably, mixed with the turbine discharge in a mixing tube which is constructed as a thrust-producing nozzle.

The injection chamber is constructed from highly temperature-resisting material and constitutes a combustion chamber. The portion of the combustion gases which are passed on to the turbine are preferably subjected to valve control. The centrifugal injection chamber provides for excellent mixing between injected fuel and compressed air. The thrust production ensures also an adequate pressure gradient in the turbine.

An electrical machine may be drivingly connected to the turbine. When run as a generator, one can use the electricity to drive a motor, or the like. When run as a motor, this electrical machine may start the turbine.

The preferred embodiment of the invention, the objects and features of the invention, and further objects, features and advantages thereof, will be better understood from the following description taken in connection with the accompanying drawing.

DESCRIPTION OF THE DRAWING

The FIGURE is a somewhat schematic view of a drive and power unit as per the preferred embodiment of the invention for practicing the best mode thereof.

The FIGURE illustrates actually a small version for the inventive system that is particularly suitable for the purposes described below. The drive and power system or unit includes a compressor 1 having an air intake 2 and being drivingly connected to a gas turbine 3. The turbine is connected to and provided with a discharge duct 4 which serves also as a component for the formation of an annular nozzle 6. This nozzle is further established by an appropriately shaped annular injection chamber 5, which serves also as a combustion chamber, into which turbine 3 discharges exhaust gas having a centrifugal, i.e., eddy, component.

A mixing tube 7 is placed onto, over, and around nozzle 6 and has its front end constructed as a thrust and thrust-producing nozzle 8. This then is the end portion of the small drive as depicted.

The compressor 1 compresses air entered via intake 2, and the compressed air is passed to the centrifugal injection chamber via a conduct 9. Fuel is injected into chamber 5 by means of an injection nozzle 10. Ignition is carried out conventionally (not shown), but results in the generation of combustion gases in the centrifugal injection chamber 5 providing a whirling outflow accordingly. These combustion gases flow in parts through nozzle 6 into mixing tube 7 and in parts through a duct or channel 11 into the turbine 3. That duct is controlled by an adjustable valve 12.

The turbine 3 is, therefore, powered by the combustion gases produced in chamber 5 and passed via conduit or duct 11. Since the compressor 1 is drivingly connected to turbine 3, fresh air is positively supplied to chamber 5. The combustion gases are decompressed in turbine 3 and are fed via channel 4 into the mixing tube 7, to be mixed with that portion of the combustion gases that flows through nozzle 6. The resulting gas flow out of tube 7 produces a thrust 13. The power output of this drive can be controlled by valve 12.

The compact power unit and system as described is of a quite simple construction and, therefore, well suited for use as a propulsion unit in unmanned aircraft, such as remotely piloted vehicles, or RPV for short. Alternatively, such a compact propulsion system can be used as the drive unit for a heat pump. As is further shown in FIG. 1, a high-frequency polyphase machine 14 is provided in between compressor 1 and turbine 3. In fact, this machine may be disposed directly on the shaft that interconnects compressor 1 and turbine 3; however, a transmission gear or the like may be interposed in order to obtain the desired speed range of the machine. Thus, an electrical machine is driven by the turbine when operated as a generator. Alternatively, machine 14 may be run as a motor for purposes of starting the turbine. In the case of a generator, the current provided therefrom may be used to run an electric motor which drives, for instance, a heat pump.

Aside from the various uses described above, the unit as described may be provided with a drive shaft, to extract therefrom motive power. A torque converter or transmission gear may be interposed between such a shaft and the load being driven.

The drive unit as per the present invention is actually a gas turbine that has been supplemented by a centrifugal injection chamber operated as a combustion chamber. The system as a whole is of a simple construction and quite inexpensive. It is, thus, suitable for purposes in which gas turbines generally have not been used in the past.

The invention is not limited to the embodiments described above; but all changes and modifications thereof, not constituting departures from the spirit and scope of the invention, are intended to be included.

I claim:

1. A drive and power unit, comprising:

a gas turbine having a central discharge duct;

a compressor drivingly connected to said turbine;

an annular injection chamber with centrifugal action surrounding in part said turbine and said discharge duct, and having its outer wall constructed to have a diameter reduction in axial direction to become an annular nozzle that surrounds said discharge duct, the extension of the discharge duct constituting an inner boundary for establishing the nozzle is an annular configuration;

first conduct means connecting the compressor to said chamber for feeding thereto air as compressed by said compressor;

fuel injection means for and connected to said chamber; and second conduct means for feeding a portion of combustion gases as produced by combustion in said chamber, to said turbine for driving same, the remainder of the combustion gases being discharged via said nozzle.

2. A unit as in claim 1, the second conduct means including a control valve for controlling the power output of said turbine.

3. A unit as in claim 1 or 2, and including a mixing tube connected to receive gases from said nozzle as well as from said turbine discharge duct, for mixing same, further having a thrust nozzle through which the gases as mixed in the tube are discharged for the production of thrust.

4. A unit as in claim 1 or 2 and including an electrical machine for selectively driving and being driven by the turbine so as to serve selectively as a turbine starter and as an electric generator, and being interposed between the turbine and the compressor.

* * * * *